United States Patent [19]

Davis et al.

[11] 4,360,400

[45] Nov. 23, 1982

[54] APPARATUS FOR BINDING CONDUCTORS IN A HARNESS

[75] Inventors: Newton G. Davis, Harrisburg; Douglas J. Leiby, Enola; Alden O. Long, Jr., Carlisle, all of Pa.

[73] Assignee: AMP Incorporated, Harrisburg, Pa.

[21] Appl. No.: 280,424

[22] Filed: Jul. 6, 1981

[51] Int. Cl.[3] .............................................. B32D 31/10

[52] U.S. Cl. ...................................... 156/468; 53/591; 156/522; 156/552

[58] Field of Search ............... 156/468, 459, 552, 522, 156/433, 434, 177, 296, 292; 53/397, 399, 591, 580, 444; 100/8

[56] References Cited

U.S. PATENT DOCUMENTS

| | | | |
|---|---|---|---|
| 3,707,425 | 12/1972 | Jamal | 156/552 X |
| 3,971,193 | 7/1976 | Tardiff | 53/591 |
| 4,311,544 | 1/1982 | Salopek | 156/552 X |

FOREIGN PATENT DOCUMENTS

| | | | |
|---|---|---|---|
| 2158747 | 10/1971 | France | 53/591 |

*Primary Examiner*—David A. Simmons
*Attorney, Agent, or Firm*—Frederick W. Raring

[57] ABSTRACT

Apparatus (26) for taping bundles of wires (4) into compact sheaves (8) comprises first and second bundling rolls (28, 30) having cylindrical surfaces (36, 38) which are in contact in a nip zone (40). First and second tapes (42, 46) are fed towards the rolls on one side of the nip zone and extend through the nip zone. Wires (4) are presented to the rolls on the one side (52) and passed through the nip zone during rotation of the rolls (28, 30). Tape is applied to each bundle from opposite sides of the bundle. On the other side (54) of the nip zone the tape is cut between adjacent bundles by knives (60) on a cutting wheel (56). A plurality of taping devices (26) can be provided on a harness making machine (12) so that the completed harnesses (2) are taped at several locations (10) along their lengths.

10 Claims, 13 Drawing Figures

APPARATUS FOR BINDING CONDUCTORS IN A HARNESS

FIELD OF THE INVENTION

This invention relates to tape applying devices for bundling and taping wires or the like, and to harness making machines having taping devices associated therewith.

BACKGROUND OF THE INVENTION

It is common practice in the manufacture of electrical harnesses to bind or tie the wires of the harness at different locations along the length of the harness. The binding is commonly done by means of bundle tie devices which can be manually applied to the wires at the desired locations so that the wires are gathered into compacted sheaves at these locations. When bundle tie devices are used, the harness wires are neatly restrained by the tie devices and the harness is thereby much easier to handle and manipulate when it is assembled to the equipment with which it is used.

While bundle tie devices serve the purpose of bundling harness wires adequately, they are relatively expensive and the task of applying bundle ties to harnesses is time consuming. It would be desirable to have a relatively simple taping device for applying inexpensive adhesive tape to the wires of a harness in place of the more expensive bundle tie devices. The present invention in accordance with one aspect thereof is directed to the achievement of a taping apparatus particularly intended for harness wires which is capable of gathering the wires into compacted bundles and then applying tape to the bundles to form compacted sheaves.

It is also common practice in the electrical industry to produce electrical harnesses by automatic or semi-automatic harness making machines which have a wire feeding mechanism, insertion stations for inserting the feed wires into the connectors, and a conveyor for transporting completed harnesses from the machine. It would be desirable to provide a taping apparatus on machines of this type and in accordance with a further aspect thereof, the invention is directed to the achievement of a taping apparatus that can be used with known types of harness making machines.

A bundling and taping apparatus in accordance with the invention comprises first and second bundling rolls which have cylindrical surfaces that are in contact with each other in a nip zone. First and second adhesive tapes are drawn from tape dispensers and fed into the nip zone from one side of the rolls. The tapes extend through the nip zone to the other side of the rolls so that when a bundle of wires is presented to the rolls and passed through the nip zone, the first and second tapes will be applied to the bundle. The rolls are provided with wire compacting and bundling means so that the wires are gathered into a compact and neat appearing sheaf prior to application of the tape to the wires. A tape cutter is provided adjacent to the other side of the nip zone which cuts the tape between adjacent wire bundles.

Several taping apparatuses as described above can be mounted in side-by-side spaced-apart relationship on a cable making machine at the discharge station of the machine. As the completed electrical harnesses are discharged from a harness making machine, they are passed through the bundling rolls of the several taping apparatuses and tape is applied to the harness at several locations.

PREFERRED EMBODIMENT OF THE INVENTION

Figures 1, 9:
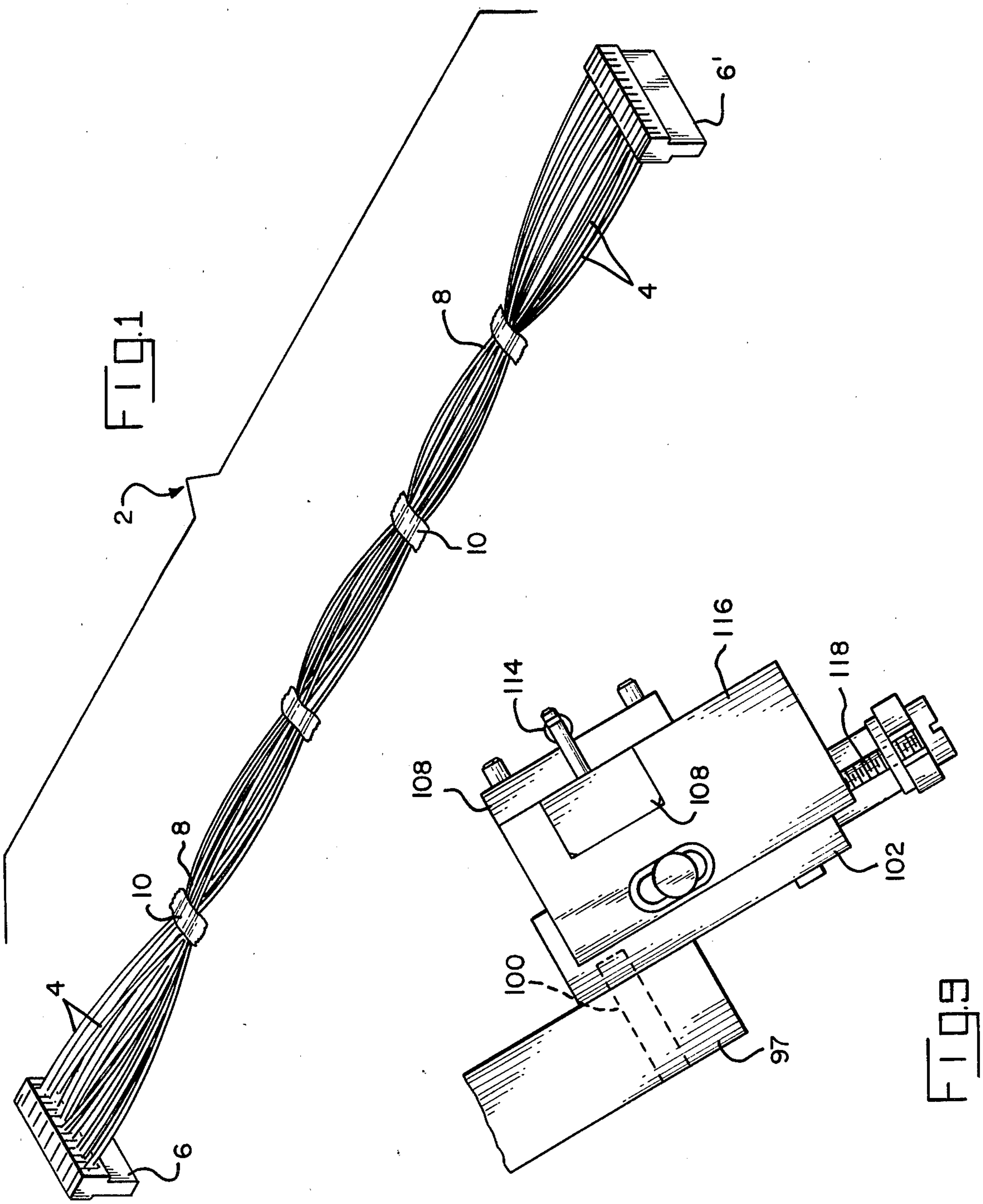
FIG. 1 is a perspective view of a simple electrical harness.
FIGS. 9 and 10 are views looking in the direction of arrows 9—9 and 10—10 of FIG. 7.

FIG. 1 shows a typical electrical harness 2 composed of a plurality of individual wires 4 having connectors 6, 6' on their ends. The harness 2 has had tape applied thereto at several locations to hold the wires in compacted bundles or sheaves 8, the tape being shown at 10. As will be explained below, two short pieces of tape are used to secure the wires at each of the sheaves 8.

Figure 2:
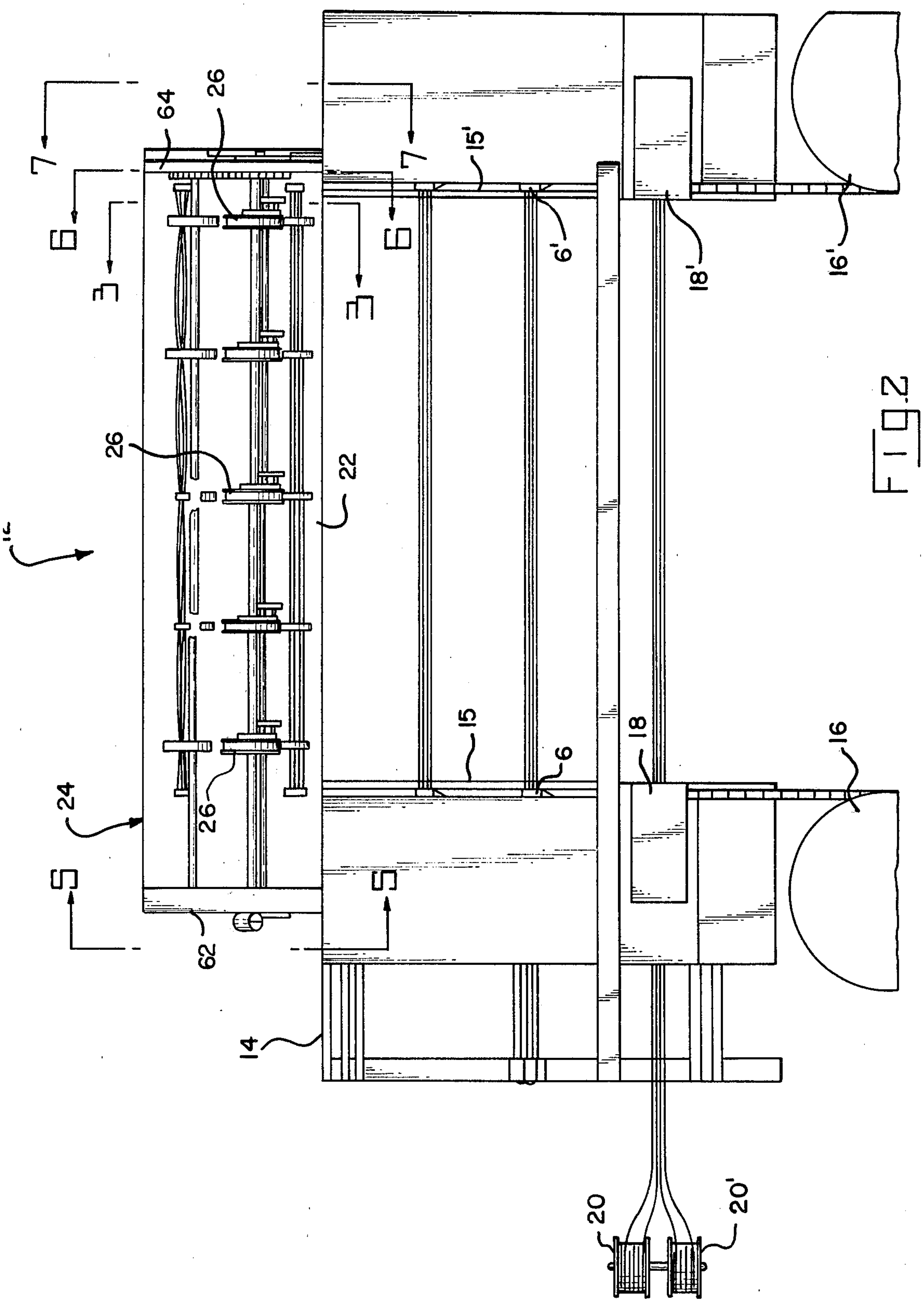
FIG. 2 is a top plan view of a harness making machine having a taping station for applying tape to the completed electrical harnesses.

The harness 2 can be produced by a harness making machine of the general type shown at 12, FIG. 2, which comprises a machine frame 14 having parallel spaced-apart converyers 15, 15' which convey completed harnesses rightwardly to a machine discharge station 22. The machine has two vibratory feeders 16, 16' for feeding connectors 6, 6' to spaced-apart stations 18, 18' at which wires are connected to the terminals in the connectors 6, 6'. The wires are fed from suitable spools or reels 20, 20' by means of a reciprocating shuttle, which is not specifically shown, or other suitable feeding means. After the leading ends of the wires have been fed to the application stations 18, 18', the wires are cut adjacent to the station 18. Thereafter, the wires are connected to the terminals in the connectors 6, 6' and completed harnesses 2 are advanced by the conveyers 15, 15' to the discharge station 22. From the discharge station 22, the wires in the harness are passed through the taping station 24 in which the wires are bundled in the vicinity of the taping apparatuses 26 and tape is applied to form the compacted sheaves 8 along the lengths of the wires. The tape between adjacent harnesses is cut by cutting knives 60, as will be described in detail below.

The taping station 24 contains a plurality of individual taping apparatuses indicated at 26. In the description which follows, an individual taping apparatus will first be described and thereafter the manner of mounting a plurality of these taping apparatuses in the taping station 24 will also be described.

Figure 3:
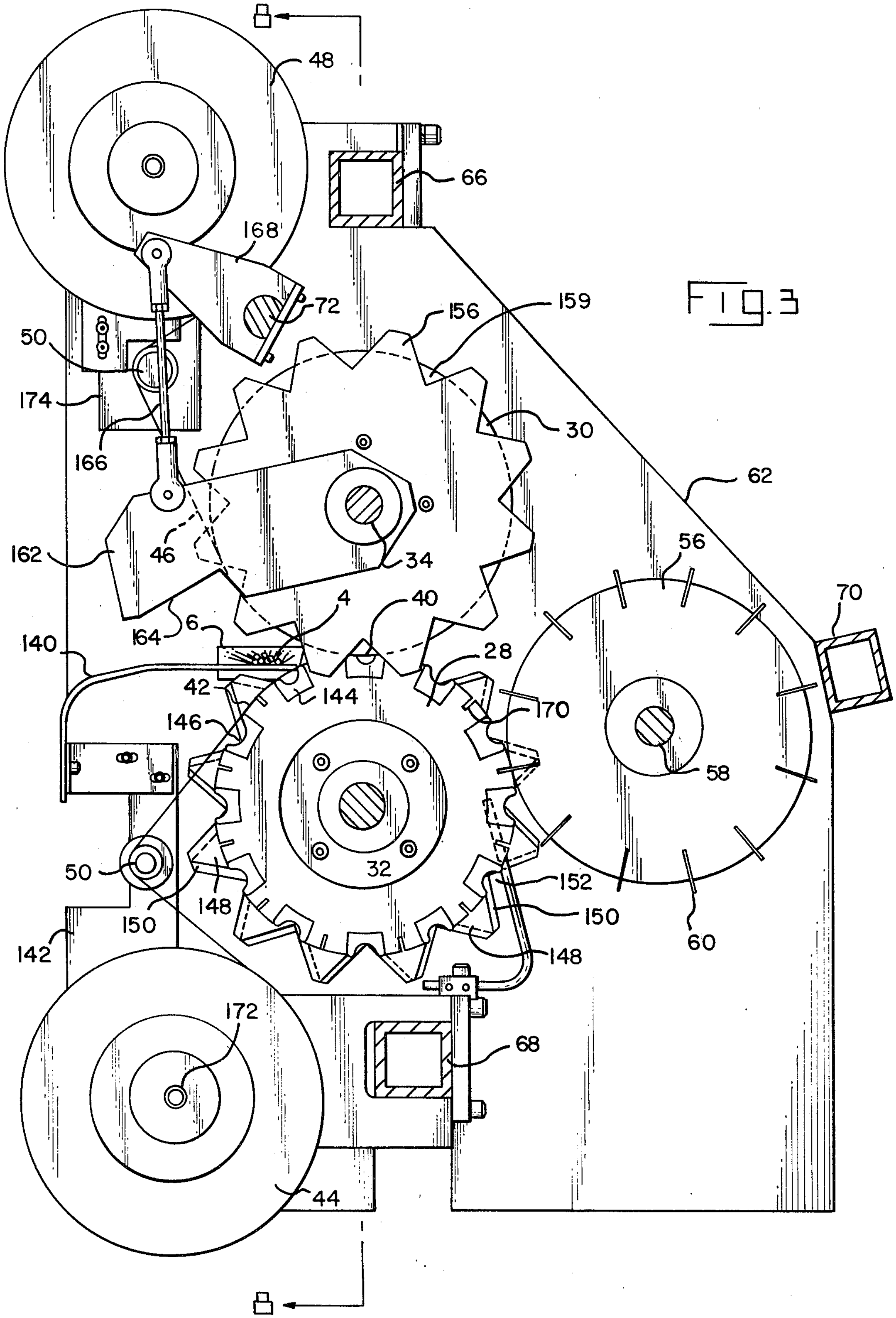
FIG. 3 is a view taken along the lines 3—3 of FIG. 2 showing details of the bundling and taping rolls, and the manner in which the tape is fed to the rolls and the manner of cutting the tape between adjacent harnesses.
Figure 4:
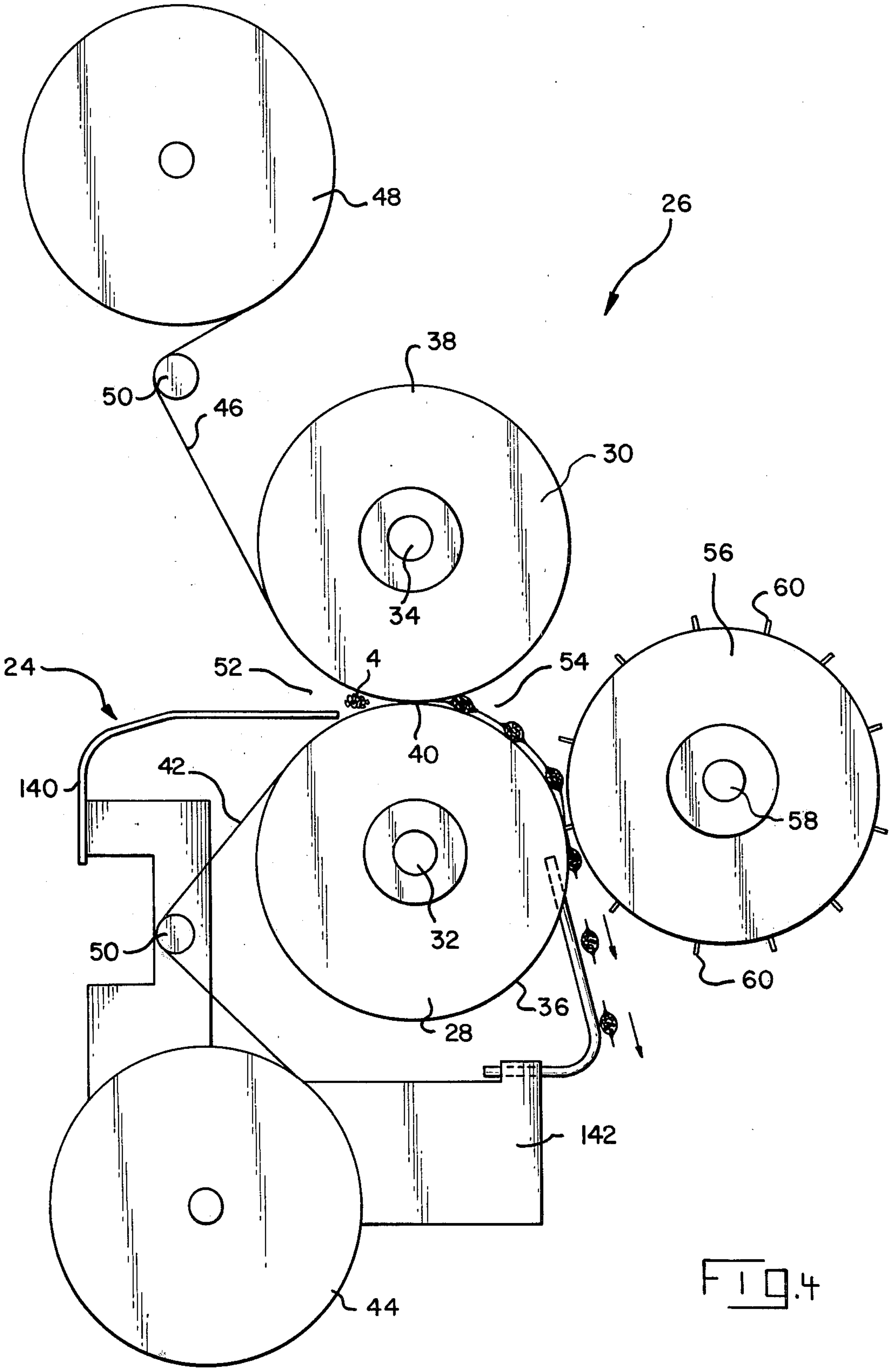
FIG. 4 is a view similar to FIG. 3 but in diagrammatic form and showing only the essential elements of bundling and taping apparatus.

FIG. 4 shows the essential parts of an individual taping apparatus 26 in diagrammatic form while FIG. 3 shows in detail the structural features of the preferred form of apparatus. The principles of the taping apparatus will first be described with reference to FIG. 4 and this description will be followed by a detailed description with reference to FIG. 3 and other drawing figures.

The apparatus 26 comprises first and second bundling and taping rolls 28, 30 which are mounted on first and second shafts 32, 34. The first and second rolls 28, 30 have cylindrical surfaces 36, 38 which are adjacent to each other and substantially in contact with each other in a nip zone 40. First and second adhesive tapes 42, 46 are dispensed from first and second rolls of tape 44, 48. The tapes are passed over guide rolls 50 which extend onto the cylindrical surfaces 36, 38 of the rolls 28, 30 on one side, the lefthand side 52, of the nip zone 40. The tapes extend through the nip zone to the other side 54 and the tapes have adhesive surfaces which are opposed to each other in the nip zone.

When a plurality of wires are presented to the rolls from the discharge station 24, the wires enter the nip zone from the lefthand side 52 and as the rolls are indexed, the wires are passed through the nip zone and the tapes 42, 46 are applied to the wires. The wires will then be compacted into a sheaf on the right-hand side of the nip zone with each wire bundle connected to the next adjacent bundle by the continuous tapes 42, 46.

The tapes are cut between adjacent wire bundles by knives 60 which are mounted on a cutting wheel 56. The cutting wheel is mounted on a third shaft 58 which extends parallel to the first and second shafts 32, 34. The individual sheaves of wires are then discharged downwardly as shown in FIG. 4. When a plurality of taping apparatuses are provided, harnesses with tape applied at several locations will be discharged.

Referring now to FIGS. 2 and 3, the taping station 24 of the cable making machine has parallel spaced-apart support plates 62, 64 adjacent to the discharge station 22 of the machine. The support plates are supported in vertical planes by horizontally extending transverse braces 66, 68, 70 which have their ends secured to the plates 62, 64.

Figure 5:
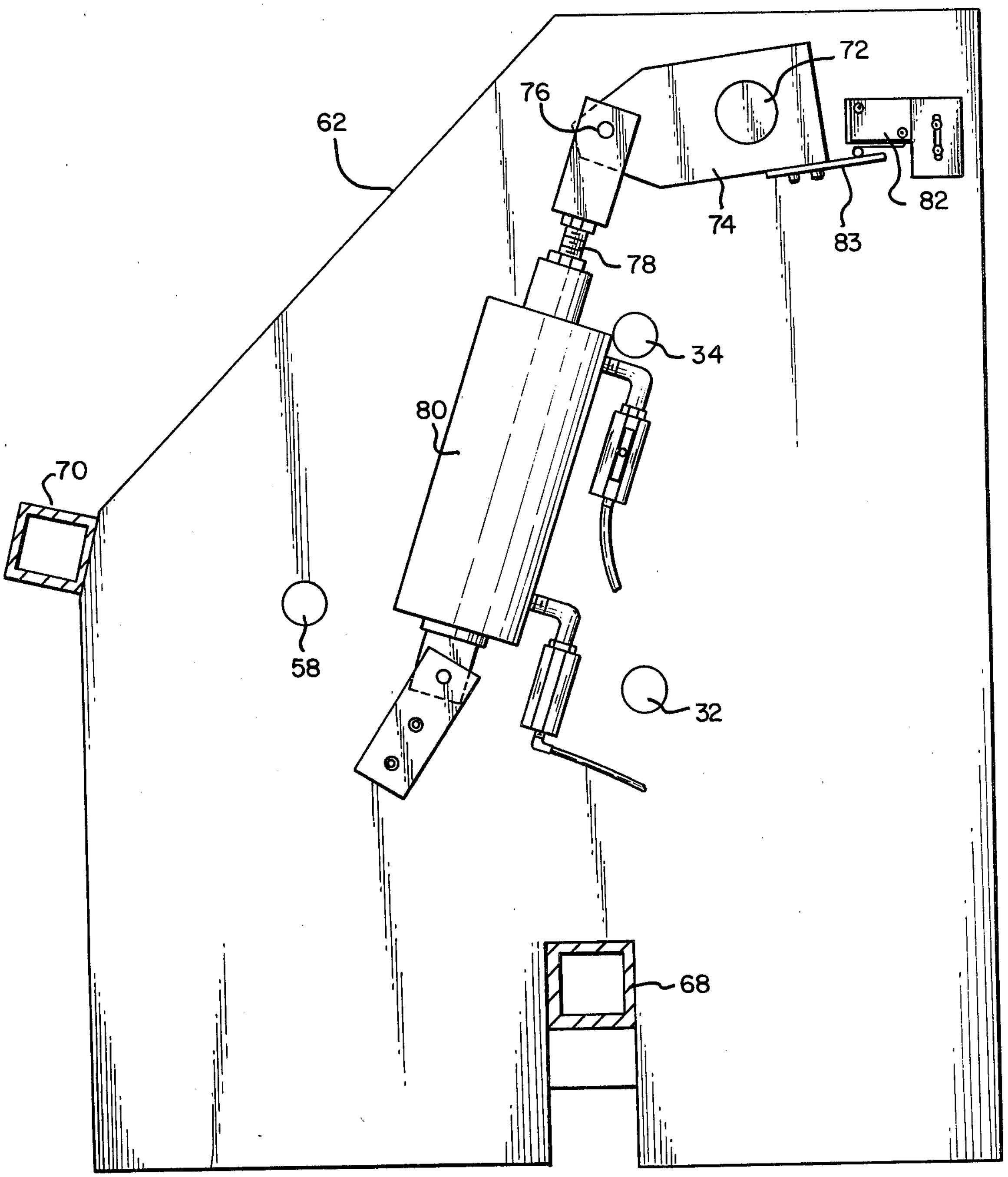
FIGS. 5, 6 and 7 are views taken along the lines 5—5, 6—6, and 7—7 of FIG. 2.

The first and second shafts 32, 34 are indexed during each operating cycle by a power shaft 72 which extends between the plates 62, 64 above the second shaft 34. Power shaft 72 extends through the frame plate 62 and has an arm 74 on its end, as shown in FIG. 5. The arm 74 has a pivotal connection 76 with the end of a piston rod 78 of a pneumatic piston cylinder 80 which is mounted on the plate 62. The supply of compressed air to the piston cylinder, which is preferably double acting, is controlled by a suitable solenoid valve which is in turn controlled by a switch 82. The switch has a switch arm which is engaged by a plate 83 which is secured to the arm 74. It will be apparent from FIG. 5 that during each operating cycle of the piston cylinder 80, the shaft 72 will be oscillated through a predetermined arc.

The oscillating motion of the shaft 72 is transmitted to the first shaft 32 by a mechanism shown in FIGS. 7 and 9–12. The shaft 32 is rotated only in a clockwise direction, as viewed in FIG. 7, during oscillation of the shaft 72 an anti-clockwise motion is prevented. The shaft 32 is coupled to the shafts 34, 58 by a gear train shown in FIG. 6, which will be described subsequently.

Figure 12:
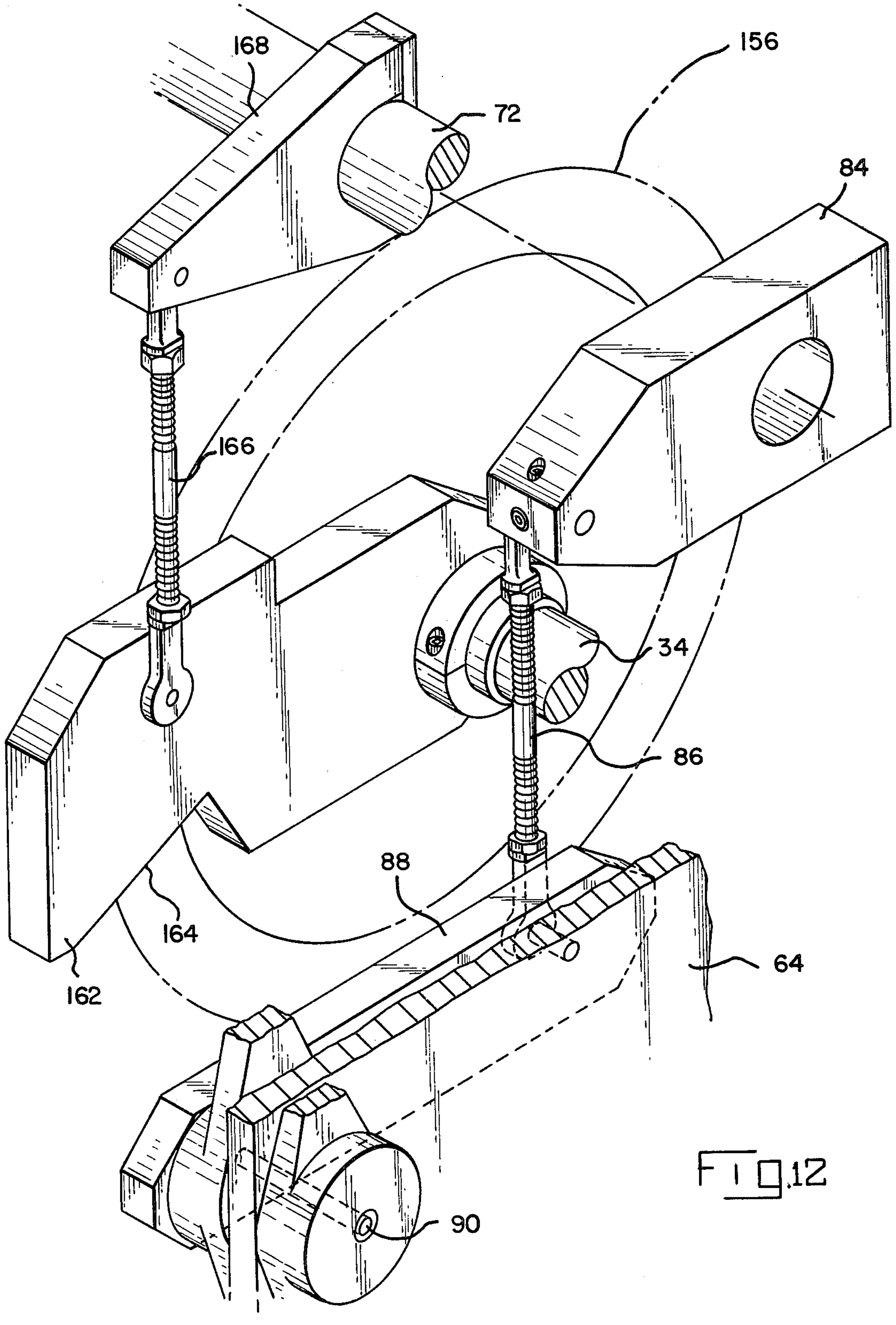
FIG. 12 is a fragmentary perspective view showing the manner in which the oscillating power shaft is coupled to one of the shafts on which the bundling rolls are mounted.

As shown in FIG. 12, the power shaft 72 has an arm 84 keyed, or otherwise secured thereto, adjacent to the plate 64. The end of arm 84 is connected by a connecting rod 86 to an arm 88 which in turn is mounted on a short stub shaft 90 that extends through the plate 64 to the external surface of that plate.

Figure 7:
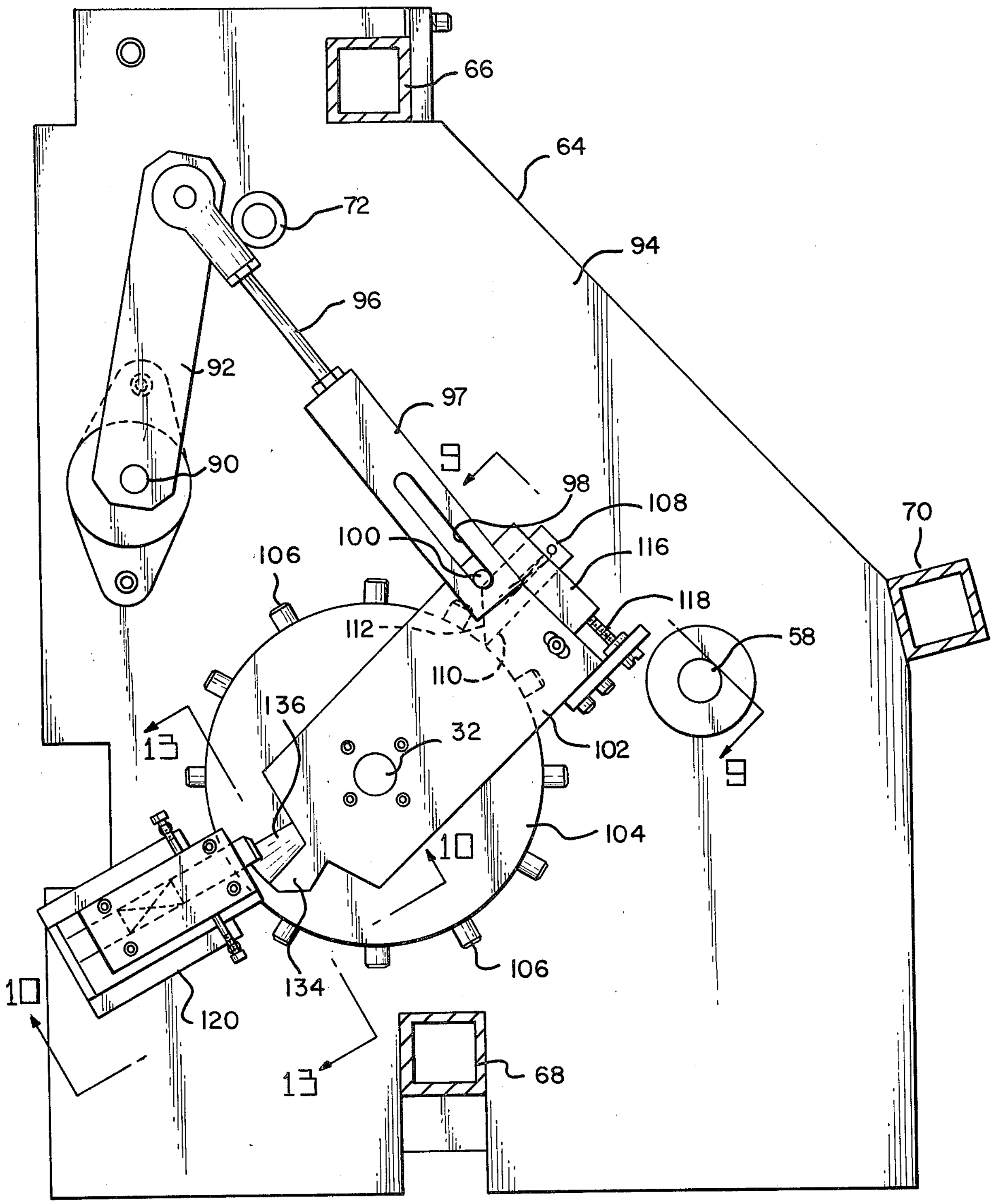

As shown in FIG. 7, a lever arm 92 is also mounted on the shaft 90 on the outside surface 94 of plate 64 and this lever arm is pivotally connected to an actuator arm 96 having an elongated bar 97 on its end in which there is provided an elongated slot 98. Slot 98 receives a pin 100 which extends from a plate 102. The plate 102 is rotatably supported on the shaft 32 so that when the lever 92 is moved through a clockwise arc, the connecting rod 96 will move downwardly from the position shown in FIG. 7. After the lost motion provided by the slot 98 is exhausted, the plate 102 will be moved through a clockwise arc. On return or anti-clockwise movement of the lever 92, the lost motion will be exhausted and the parts then returned to the position shown in FIG. 7.

The plate 102 is mounted on the shaft 32 immediately adjacent to and against a wheel 104 which is keyed to the shaft 32. The plate 102 is mounted for free rotation on the shaft in either direction. The wheel 104 has radially extending pins 106 on its periphery which are spaced apart by an amount equal to the indexing angle of the shaft 32. These pins are engaged by a dog 108 which is pivotally mounted on a block 116, which in turn is adjustably mounted on the plate 102. The dog 108 has one side 110 which bears against the adjacent pin 106 so that when plate 102 is moved through a clockwise arc by the connecting rod 96, the dog 108 will cause the wheel 104 to be rotated in a clockwise direction. The dog 108 has a lower edge 112 which is tapered towards the surface of the wheel so that the dog can ride over the pin 106 when the plate 102 is rotated in an anti-clockwise direction. A spring 114, FIG. 9, serves to permit the dog to swing in a counter clockwise direction about its own pivotal axis when it rides over the pin. Precise adjustment of the dog is achieved by an adjusting screw 118 which determines the location of the block 116.

Figure 10:
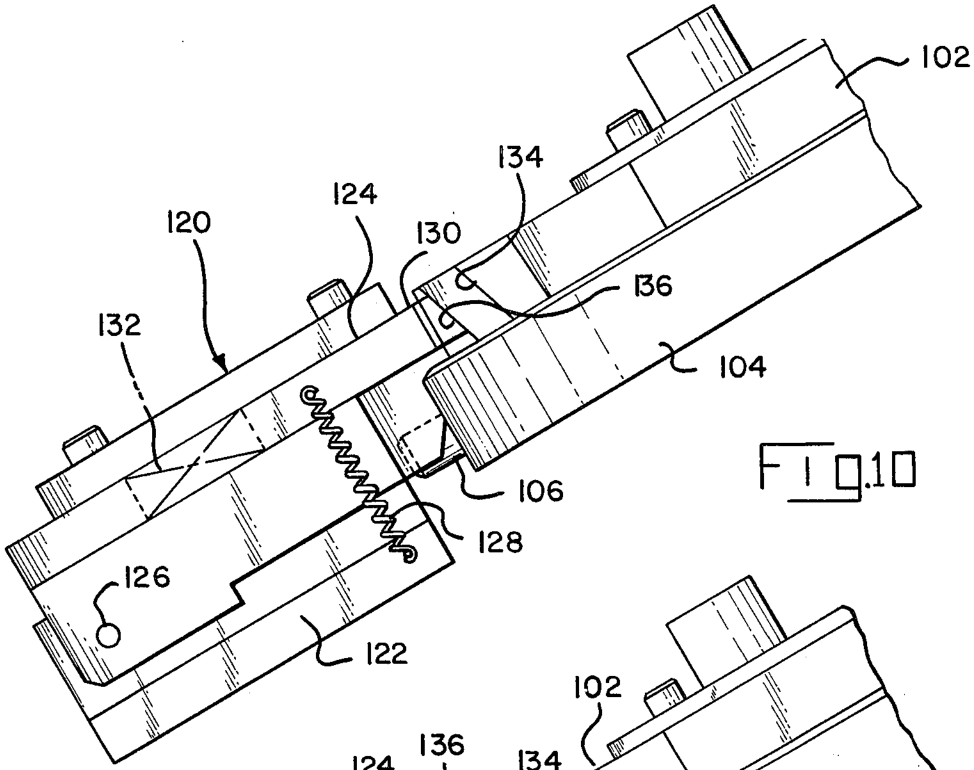

It is necessary to provide an anti-reverse device 120 for the wheel 104 to hold it stationary when it is not being indexed by the connecting rod 106. This anti-reversing device, FIGS. 7, 10 and 11, comprises a block 122 which is secured to the surface of the plate 64 adjacent to the wheel 104. An arm 124 is pivotally mounted on block 122 as shown at 126, so that the arm 124 can be swung through a counter-clockwise arc from its position as shown in FIG. 10, to the position shown in FIG. 11. Arm 124 is biased in a clockwise direction to the position shown in FIG. 10 by a suitable spring 128 which is connected to the arm and to the block 122.

Figure 13:
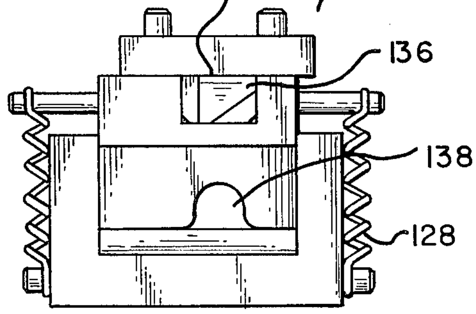
FIG. 13 is a view taken along the lines 13—13 of FIG. 7.

The arm 124 carries a dog 130 which is resiliently biased towards the plate 102 by a spring 132. The end of the dog 130 is engaged by the inclined and contoured surface 136 of an extension 134 of the plate 102, see FIG. 7. The arm 124 also has a notch 138 (FIG. 13) which receives the adjacent pin 106 when the arm is in the position of FIGS. 10, and 13, to prevent movement of the wheel 104 when the wheel is not being indexed.

Figure 11:
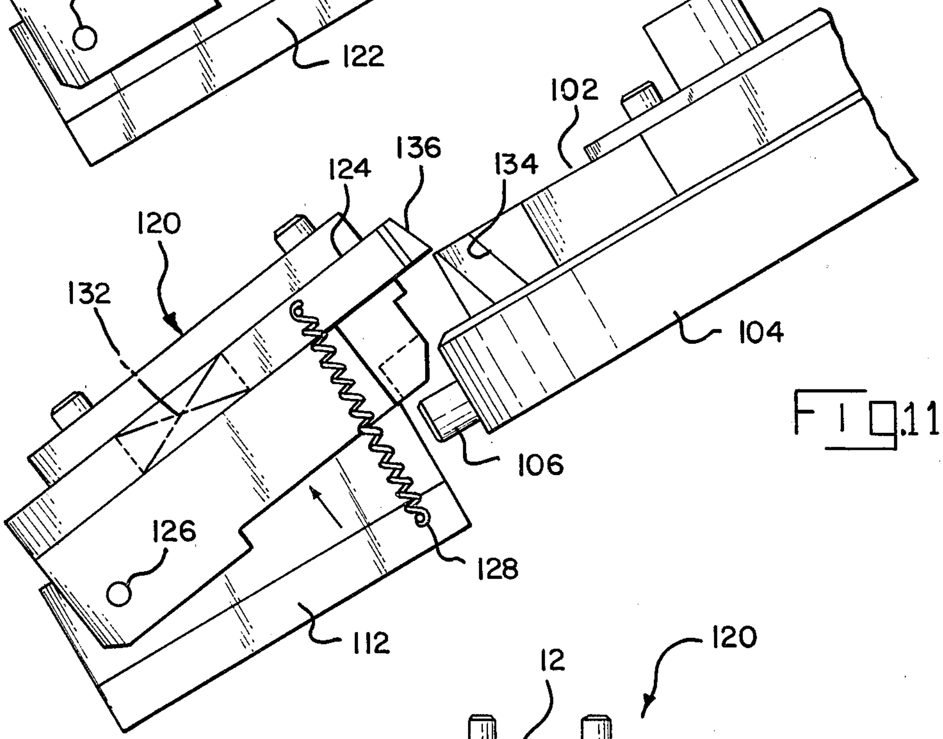
FIG. 11 is a view similar to FIG. 10 but showing the positions of the parts during an indexing of the bundling rolls.

Indexing the wheel is brought about by the fact that the surface 136 of the extension 134 of the plate 102 swings the arm 124 from the position of FIG. 10 to the position of FIG. 11 when the plate 102 moves in a clockwise direction. The adjacent pin 106 shown in FIG. 11 can then move past the arm 124. When the plate 102 returns to its normal position as shown in FIG. 7, arm 124 is returned to the position shown in FIG. 10 by the spring 128 thereby holding the wheel against motion in either direction.

Figure 6:
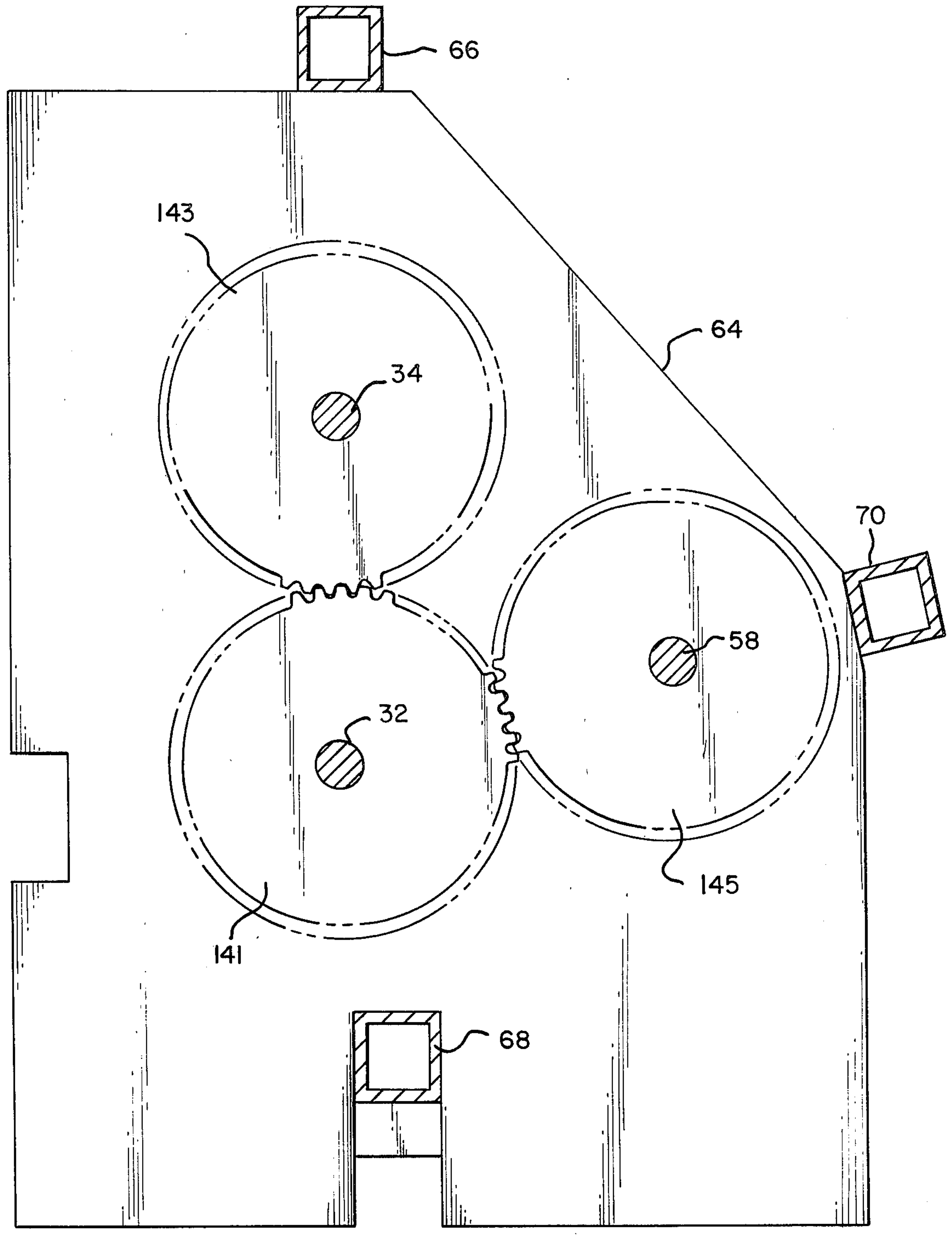

The indexing of the shaft 32 which is brought about by the mechanisms shown in FIGS. 7 and 9–11 is transmitted to the shafts 34 and 58 by a gear train shown in FIG. 6. The shaft 32 has a gear wheel 141 on its internal surface which meshes with gears 143 and 145 on the shafts 34 and 58. The three shafts 32, 34, and 58 are thereby rotated in unison through the same angle during each operating cycle of the apparatus.

An individual taping apparatus will now be described in detail with reference to FIGS. 3 and 8.

The harnesses are guided from the discharge station 22 of the machine 12 towards the nip zones of the several taping apparatuses by means of brackets or guide bars 140 which are in turn supported on support brackets 142 that are secured to the frame member 68. The guide bars 140 have surfaces which lead towards the nip zones of the taping apparatuses.

The first roll 28 has angularly spaced inserts 144 in its surface 36 and each insert has a semi-cylindrical recess 146, the size of which conforms to the number of wires in the harness. As illustrated in FIG. 3, each recess receives the wires and the wires are compacted into a generally cylindrical sheaf as the wires pass through the nip zone 40.

Bundling of the wires as they enter the nip zone is carried out by star wheels 148, 150 on the roll 28 and star wheels 156, 158 on the roll 30. The star wheels 148, 150 on the roll 28 are mounted on a hub 154 against only one side of the roll 28, see FIG. 8 and each star wheel has notches 152 which form pockets for the wires. The star wheels 148, 150 are adjustably mounted so that they can be moved relative to each other thereby varying the effective size of each notch to adapt the machine to wires of varying diameters and varying numbers.

The stars wheels 156, 158 on the roll 30 are mounted against both side surfaces of this roll and these star wheels also have notches as shown at 159 which cooperate with the notches in the two star wheels 148, 150 of the lower roll 28. It will be apparent from FIG. 3 that the notches in the star wheels thus tend to compress the wires into a compacted bundle which is received in the recesses 146 of the associated insert at 144. When the wires are so compacted, the tapes 42, 46 are applied to retain the wires in the sheaves 8 after the harness leaves the taping station of the machine.

Figure 8:
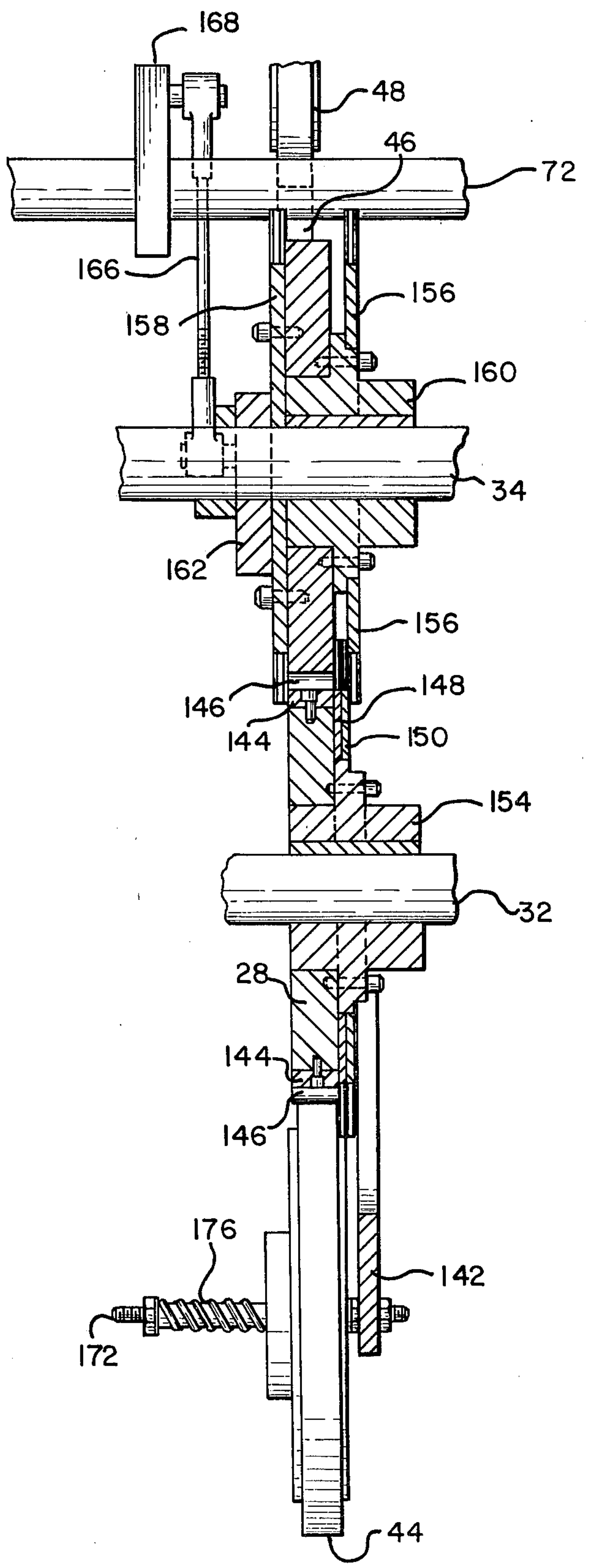
FIG. 8 is a view taken along the lines 8—8 of FIG. 3.

The star wheel 158 is mounted on a hub 160 on the shaft 34 and is located such that it is on the outside surface of the pair of star wheels 148, 150 which are associated with the roll 28, see FIG. 8. This arrangement further assists in compacting the wires into a neat sheaf when the tape is applied.

Each harness, as it is presented to the taping apparatuses and passed through the taping station, is pushed into the nip zones of the rolls by means of a bundle feeding arm 162, each taping apparatus having an associated bundle feeding arm. As shown in FIG. 3, the arm 162 is mounted for free rotation on the shaft 34 and has a lower edge 164 which engages the wires of a harness and pushes them towards the rolls when the arm 162 is rotated in a counter-clockwise direction. This movement of the arm 162 is brought about by a connecting rod 166 which is pivoted to the arm 162 and at its upper end is pivoted to a lever arm 168 that is mounted on the shaft 72. It will be apparent that during indexing of the shaft 72, the arm 162 will push the adjacent harness towards the bundling rolls 28, 30 and during return movement of the shaft 72, the arm will be returned to the position shown at 73 to provide clearance for the next harness. The tape dispensers 44, 48 are mounted on stub shafts 172 carried by the bracket 142 and by an upper bracket indicated at 174. These tape dispensing rolls may be of the commercially available type having springs 176 for adjusting the drag on the roll of tape.

A significant advantage of a taping apparatus in accordance with the invention is that the bundle of wires to which tape is being applied pass completely through the nip zone and are discharged on the opposite side 54 of the zone from the side 52 on which they are received. This feature adapts the apparatus to use in a continuously operating cable making machine, as illustrated in FIG. 2. There are many known tape applying devices which receive a bundle of wires or the like, from one side of the apparatus but which eject the taped bundle on the same side as the side on which the bundle is received. This type of taping apparatus is not satisfactory for a machine of the type shown in FIG. 2.

The taping apparatus has been shown in conjunction with a particular type of cable making apparatus illustrated in FIG. 2, but it should be understood that the apparatus can be used with other types of cable making machines, or it can be used as a separate machine for applying individual tapes to harnesses. Under these circumstances, the taping apparatus can be fed manually by an operator who would present to the machine individual harnesses for taping.

We claim:

1. A bundling and binding apparatus which bundles a pluralilty of substantially parallel wires into a compacted sheaf and applies binding tape to the compacted sheaf, said apparatus comprising:

first and second bundling rolls, said rolls being mounted on first and second shafts which are in parallel spaced-apart relationship, said rolls having cylindrical surfaces which are in contact with each other in a nip zone, first and second tape dispensing means associated with said first and second rolls, first and second bundling tapes extending from said dispensing means towards said rolls on one side of said nip zone, said tapes extending onto said cylindrical surfaces of said rolls, over said cylindrical surfaces and through said nip zone to the other side of said nip zone, said tapes having adhesive surfaces which are opposed to each other, indexing means for indexing said first and second shafts in opposite directions of rotation through a predetermined angle of rotation, a plurality of bundle receiving recesses on said cylindrical surface of said first roll, said recesses being located at equally spaced angular intervals and extending across said cylindrical surface and between the side surfaces of said first roll and a plurality, equal to the number of said bundle receiving recesses, of gathering and guiding means mounted on at least one of the side surfaces of one of said rolls, each of said gathering and guiding means extending radially beyond the cylindrical surface of the associated roll and having opposed convergent surfaces, the opposed convergent surfaces extending towards the cylindrical surface of the roll whereby, upon presentation of a bundle of wires to said rolls on said one side of said nip zone and indexing of said rolls, said bundle will be gathered and guided into one of said recesses by said gathering and guiding means, and said bundle will be passed through said rolls to the other side of said nip zone, and portions of said first and second bundling tapes will be adhered to said bundle to form a sheaf.

2. A bundling and binding apparatus as set forth in claim 1, each of said rolls having a bundling and guiding means as set forth in claim 1 on at least one of its side surfaces.

3. A bundling and binding apparatus as set forth in claim 2 having a bundle feeding arm on said one side of said nip zone, said feeding arm being normally in a relatively remote position with respect to said nip zone so that said bundle can be presented to said rolls, said arm being movable towards said nip zone during indexing of said rolls and being effective to push said bundle into said nip zone while said bundle is being gathered and guided by said gathering and guiding means.

4. A bundling and binding apparatus as set forth in claim 3, said bundle feeding arm being mounted on, and extending from, one of said first and second shafts.

5. A harness bundling and binding apparatus which is used on a harness making machine which serially produces electrical harnesses, each harness comprising a plurality of parallel wires, said harness making machine having a conveyor which transports said bundles laterally of their axes to a conveyor discharge station at which said harnesses move laterally of their axes from said conveyor, said harness bundling and binding apparatus comprising:

at least one bundling and binding device, each of said bundling and binding device comprising first and second bundling rolls, said rolls being mounted on first and second shafts which are in parallel spaced-apart relationship, said rolls having cylindrical surfaces which are in contact with each other in a nip zone, first and second tape dispensing means associated with said first and second rolls of each of said devices, first and second bundling tapes extending from said dispensing means towards said rolls on one side of said nip zone, said tapes extending onto said cylindrical surfaces of said rolls, over said cylindrical surfaces and through said nip zone to the other side of said nip zone, said tapes having adhesive surfaces which are opposed to each other, indexing means for indexing said first and second shafts in opposite directions of rotation through a predetermined angle of rotation, a plurality of bundle receiving recesses on said cylindrical surface of said first roll, said recesses being located at equally spaced angular intervals and extending across said cylindrical surface and between the side surfaces of said first roll and a plurality, equal to the number of said bundle receiving recesses, of gathering and guiding means mounted on at least one of the side surfaces of one of said rolls, each of said gathering and guiding means extending radially beyond the cylindrical surface of the associated roll and having opposed convergent surfaces, the opposed convergent surfaces extending towards the cylindrical surface of the roll whereby, during operation of said harness making machine, said harnesses are discharged from said conveyor and received by said rolls on said one side of said nip zone of each bundling and binding device, and said bundles of each harness are serially passed through said rolls to the other side of said nip zones, said bundles being compacted into sheaves by said rolls, and portions of said first and second bundling tapes will be adhered to said sheaves on opposite sides thereof and adjacent portions of said tapes will be adhered to each other whereby said sheaves will be bound by said tapes.

6. A harness bundling and binding apparatus as set forth in claim 5, each of said bundling and binding devices having tape cutting means proximate to said rolls on said other side of said nip zone for cutting said tape adjacent to said sheaves.

7. A harness bundling and binding apparatus as set forth in claim 6, each of said tape cutting means comprising a cutting wheel which is mounted on a third shaft, said third shaft extending parallel to said first and second shafts, said indexing means being effective to index said third shaft in unison with said first and second shafts, said cutting wheels, having tape cutting blades thereon, said cutting blades engaging said first roll of each bundling and binding device at locations between said bundle receiving zones thereby to cut said tape.

8. A harness bundling and binding apparatus as set forth in either of claims 5 to 11, each of said bundling and binding devices having a static guide surface on said one side of said nip zone for guiding said harnesses from said discharge station into said nip zone.

9. A harness bundling and binding apparatus as set forth in claim 8, each of said bundling and binding devices having a feeding arm on said one side of said nip zone, said feeding arm being normally in a relatively remote position with respect to said nip zone so that a bundle can be presented to said rolls, said arm being movable towards said nip zone during indexing of said rolls and being effective to push said bundle into said nip zone across said guide surface.

10. A harness bundling and binding apparatus as set forth in claim 9, said feeding arm of each bundling and binding device being mounted on, and extending from, one of said first and second shafts.

* * * * *